United States Patent
Berkemeier et al.

(10) Patent No.: US 11,293,338 B2
(45) Date of Patent: Apr. 5, 2022

(54) METHODS AND SYSTEMS FOR AN IGNITION ARRANGEMENT OF AN INTERNAL COMBUSTION ENGINE

(71) Applicant: Ford Global Technologies, LLC, Dearborn, MI (US)

(72) Inventors: Oliver Berkemeier, Bergisch Gladbach (DE); Maziar Khosravi, Cologne (DE)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 17/012,272

(22) Filed: Sep. 4, 2020

(65) Prior Publication Data
US 2021/0062710 A1 Mar. 4, 2021

(30) Foreign Application Priority Data
Sep. 4, 2019 (DE) .......................... 102019123695.9

(51) Int. Cl.
| | |
|---|---|
| *F02B 19/12* | (2006.01) |
| *F02D 13/06* | (2006.01) |
| *F02B 19/18* | (2006.01) |
| *F02D 13/02* | (2006.01) |
| *F02B 19/10* | (2006.01) |

(52) U.S. Cl.
CPC .............. *F02B 19/12* (2013.01); *F02B 19/10* (2013.01); *F02B 19/1042* (2013.01); *F02B 19/18* (2013.01); *F02D 13/0215* (2013.01); *F02D 13/06* (2013.01); *F02D 13/0269* (2013.01)

(58) Field of Classification Search
CPC ...... F02B 19/1042; F02B 19/10; F02B 19/12; F02B 19/18; F02D 13/06; F02D 13/0215; F02D 13/0269; F02D 13/0276; F02D 15/00; H01T 13/54; H01T 13/467; F02P 15/10

See application file for complete search history.

(56) References Cited

U.S. PATENT DOCUMENTS

| | | | | |
|---|---|---|---|---|
| 3,871,351 | A * | 3/1975 | Geiger | ................ F02B 19/1042 123/258 |
| 7,659,655 | B2 | 2/2010 | Tozzi et al. | |
| 7,922,551 | B2 | 4/2011 | Tozzi | |
| 9,856,848 | B2 * | 1/2018 | Chiera | ................ F02B 19/1095 |
| 2012/0125279 | A1 | 5/2012 | Hampson et al. | |
| 2016/0230645 | A1 * | 8/2016 | Schock | ................... F02B 19/06 |
| 2020/0149498 | A1 * | 5/2020 | Loetz | .................... F02M 25/03 |
| 2020/0200068 | A1 * | 6/2020 | Schock | ................... F02B 21/02 |
| 2020/0362750 | A1 * | 11/2020 | Rabhi | ..................... F02B 19/02 |

FOREIGN PATENT DOCUMENTS

| | | |
|---|---|---|
| DE | 102011053530 A1 | 5/2012 |
| DE | 112010003410 B4 | 10/2018 |
| EP | 1701419 A1 | 9/2006 |

* cited by examiner

*Primary Examiner* — George C Jin
(74) *Attorney, Agent, or Firm* — Geoffrey Brumbaugh; McCoy Russell LLP

(57) ABSTRACT

Methods and systems are provided for a prechamber. In one example, the prechamber comprises one or more valves for optionally adjusting gas flow therethrough. The one or more valves may allow pre-chamber and combustion chamber settings to be modified, thereby enhancing combustion operating parameters.

19 Claims, 5 Drawing Sheets

METHODS AND SYSTEMS FOR AN IGNITION ARRANGEMENT OF AN INTERNAL COMBUSTION ENGINE

CROSS REFERENCE TO RELATED APPLICATIONS

The present application claims priority to German Patent Application No. 102019123695.9 filed on Sep. 4, 2019. The entire contents of the above-listed application is hereby incorporated by reference for all purposes.

FIELD

The present description relates generally to an ignition arrangement of an internal combustion engine.

BACKGROUND/SUMMARY

For more efficient combustion of lean air-fuel mixtures, it is possible to use precombustion chambers with prechamber ignition plugs. The basis of the functional principle is that, during the compression of the air-fuel mixture in the combustion space, a part of the air-fuel mixture is forced through openings, for example holes, into the prechamber which is partitioned off from the combustion space. Resulting flow conditions, and the density difference between fuel and air, may lead to stratification in the prechamber, such that fuel-rich regions are generated in which an ignition is facilitated.

After ignition in the prechamber, flames propagate through the openings into the combustion space, and lead to an ignition of the rest of the air-fuel mixture therein. The configuration of the openings between combustion space (main combustion chamber) and prechamber with regard to number, arrangement, geometry etc., may constitutes a compromise for the functions of admission of a part of the air-fuel mixture from the combustion space into the pre-chamber, propagation of flames from the prechamber into the combustion space, and discharging of residual gases out of the prechamber into the combustion space. Under certain operating conditions, and in the presence of particular air-fuel mixtures, the ignition behavior may therefore be inadequate, which can result in misfiring and increased wear of the components involved.

In some examples, such as in DE112010003410T5 and U.S. Pat. No. 7,659,655 B2 have disclosed prechamber ignition plugs which have a straight central hole, which extends parallel to the longitudinal axis of the ignition plug, and angled peripheral holes. The peripheral holes serve primarily for the admission of the air-fuel mixture into the precombustion chamber. Said peripheral holes are configured such that the flow is reduced during the outflow process, such that the outflow of the hot gases occurs primarily through the central hole.

In another example, EP1701419 A1 teaches a prechamber ignition plug with openings which produce a connection between the precombustion chamber and the combustion space and which serve for the discharge of the residual gases and for the propagation of flames into the combustion space. Said openings may be differently designed and arranged, for example centrally and laterally, in order to be able to permit a simple admission of fluids into the precombustion chamber and influence the flow conditions in targeted fashion. Furthermore, the prechamber ignition plug described in EP1701419A1 has a fluid channel which extends along in the ignition plug and which opens out in an opening for the feed of the fluid, for example fuel, into the precombustion chamber.

DE102011053530A1 teaches a prechamber ignition plug with a prechamber which has a front and a rear chamber. The admission and discharge of the air-fuel mixture and of the residual gases respectively, and the propagation of the flames, occur via a central hole and a multiplicity of peripheral holes which connect the precombustion chamber to the combustion space. The combustion process is optimized by means of this configuration.

In one example, the issues described above may be at least partially solved by A system, comprising a pre-chamber comprising a first passage fluidly coupled to an inlet passage and a second passage fluidly coupled to an exhaust passage, wherein an ignition device is configured to provide a spark directly into an interior volume of the pre-chamber. In this way, combustion conditions may be enhanced to increase efficiency.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
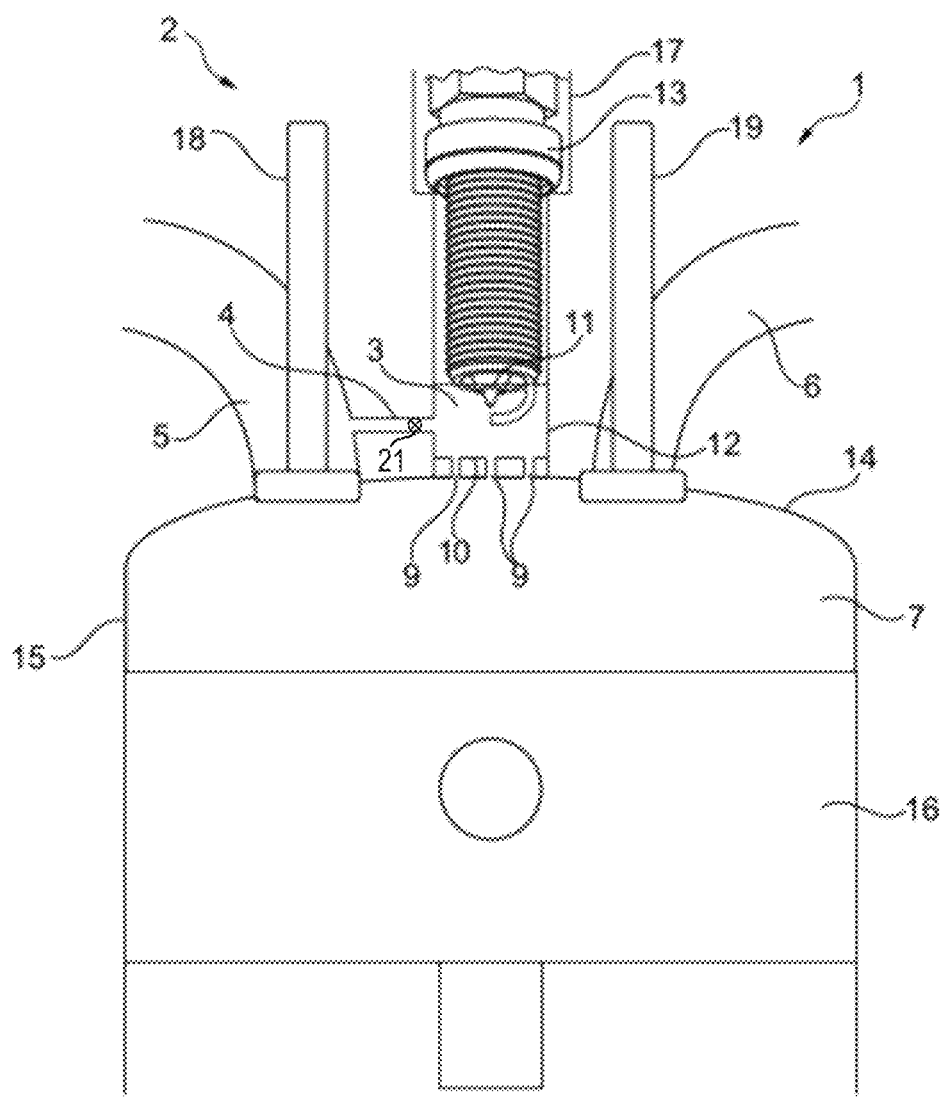
FIG. 1 shows an exemplary internal combustion engine with an ignition arrangement.
Figure 2:
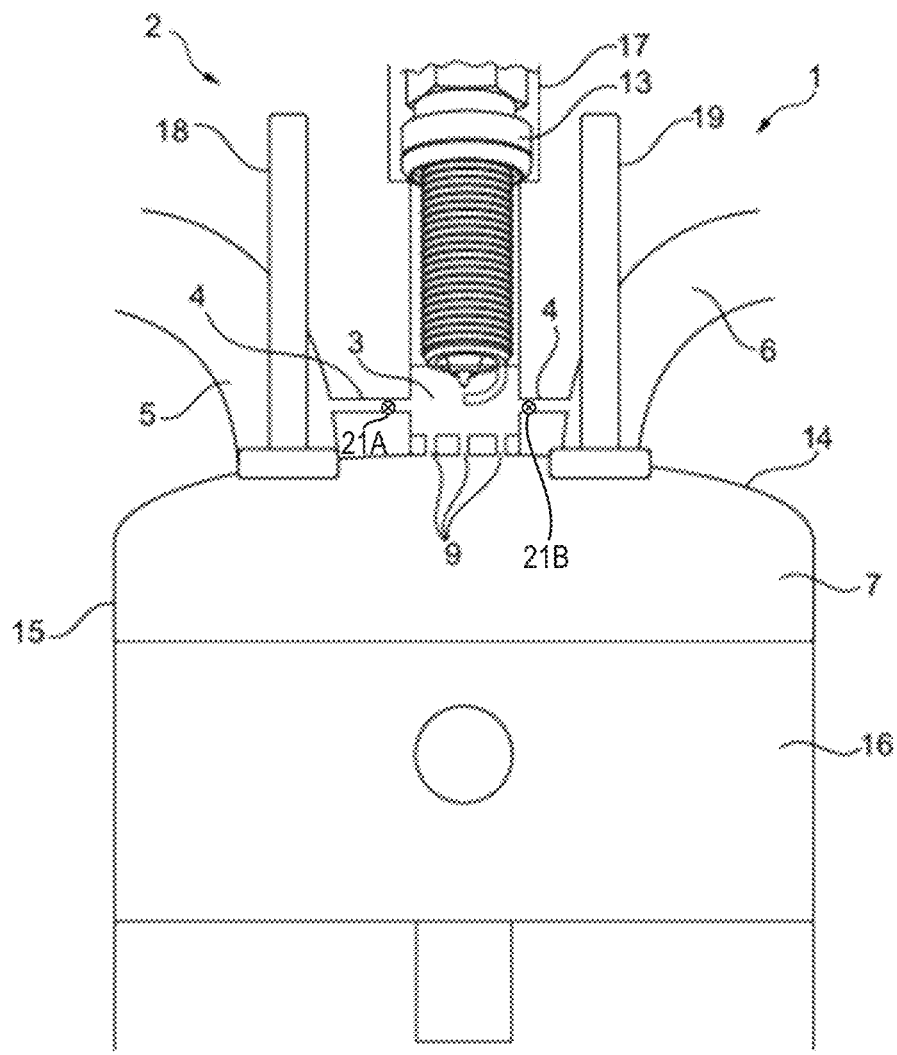
FIG. 2 shows a further exemplary internal combustion engine with an ignition arrangement.
Figure 3:
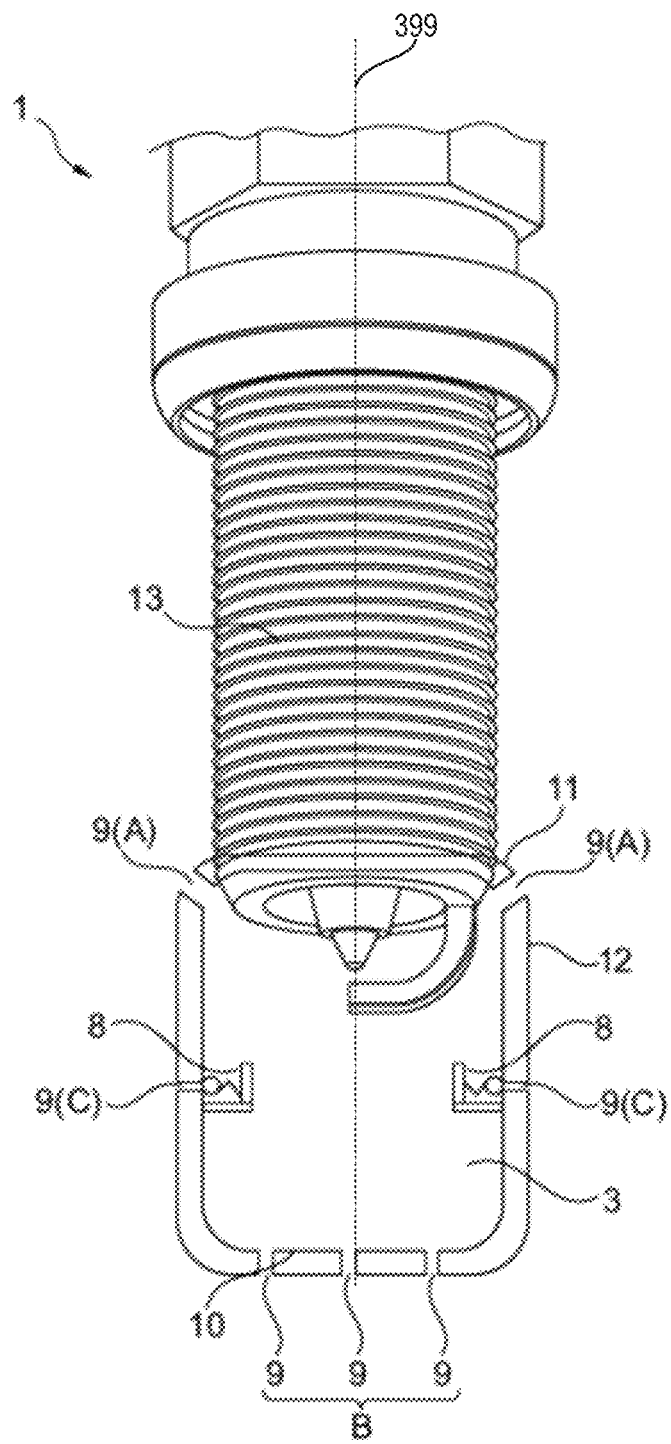
FIG. 3 shows an exemplary ignition arrangement.
Figure 4:
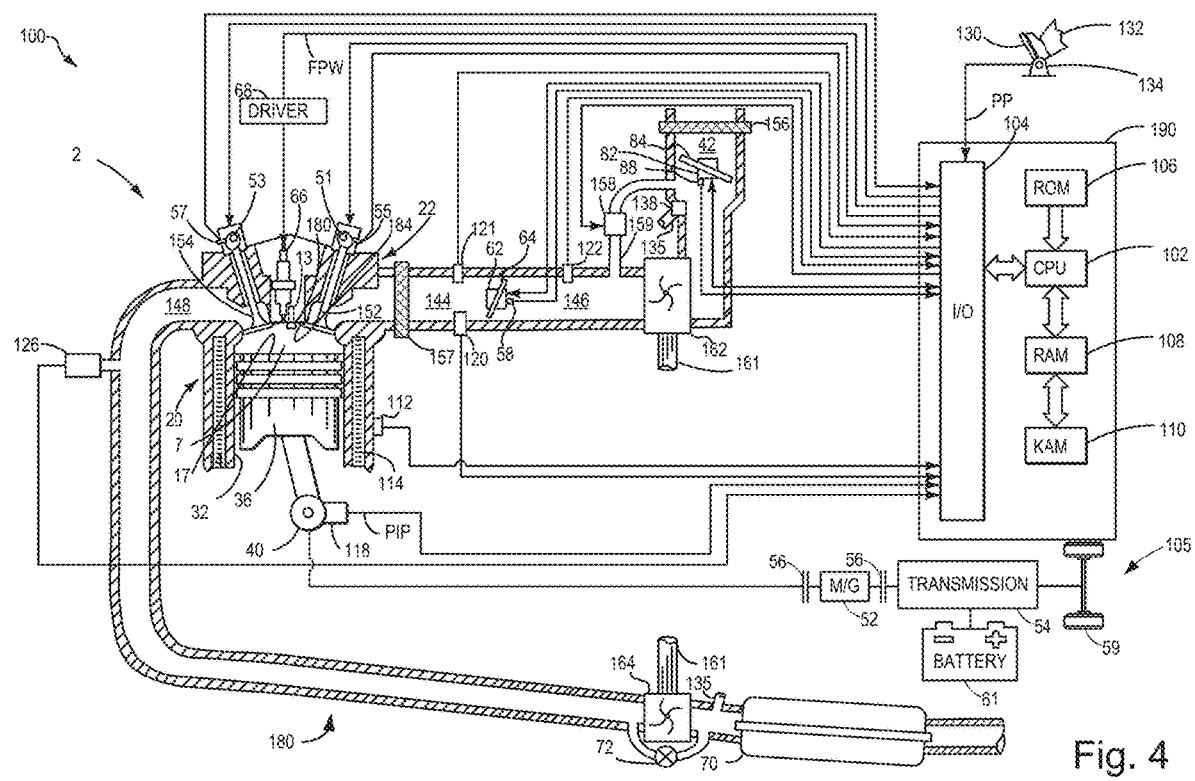
FIG. 4 illustrates a schematic of an engine included in a hybrid vehicle.
Figure 5:
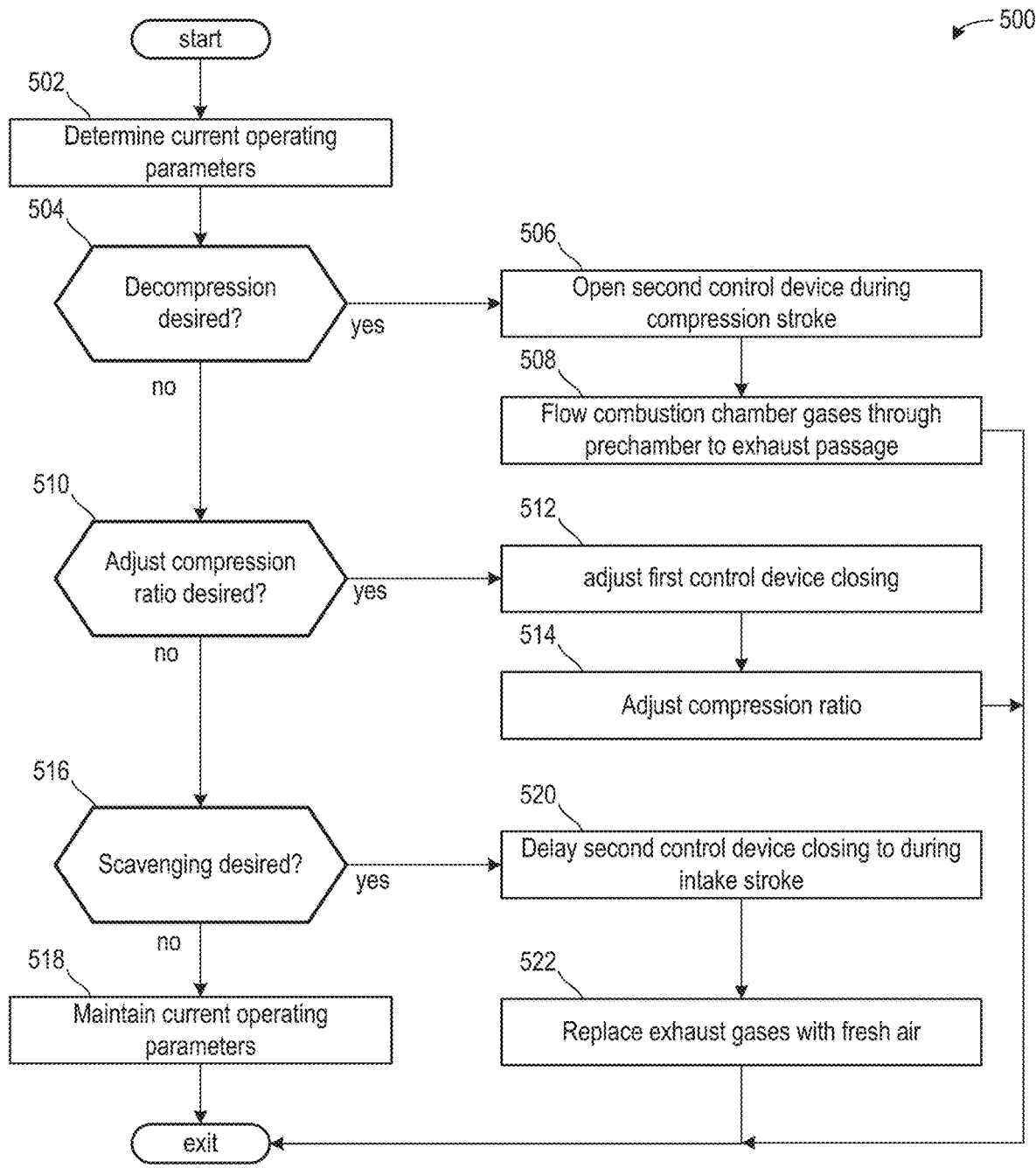
FIG. 5 illustrates a method for adjusting valves of the pre-chamber.

The following description relates to systems and methods for a pre-chamber. FIG. 1 shows an exemplary internal combustion engine with an ignition arrangement. FIG. 2 shows a further exemplary internal combustion engine with an ignition arrangement. FIG. 3 shows an exemplary ignition arrangement. FIG. 4 illustrates a schematic of an engine included in a hybrid vehicle. FIG. 5 illustrates a method for adjusting valves of the pre-chamber.

A first aspect of the disclosure relates to ignition arrangement for an internal combustion engine has a precombustion chamber. The precombustion chamber has connecting devices for direct fluid-conducting connection between the precombustion chamber and an inlet channel and/or an outlet channel of a main combustion chamber of the internal combustion engine.

An internal combustion engine, which may be also referred to as a combustion machine, is to be understood to mean an internal combustion machine for converting chemical energy contained in the fuel into mechanical work. The fuel combustion takes place in a combustion space of the internal combustion engine, hereinafter also referred to as main combustion chamber, which is formed by the volume enclosed by cylinder, piston and cylinder head. For the introduction of a fluid, for example of an air-fuel mixture, into the main combustion chamber, an inlet channel is provided. The discharge of the combustion gases from the main combustion chamber occurs via an outlet channel. The internal combustion engine may for example be in the form of an auto-ignition or applied-ignition internal combustion engine. As fuel, use may be made for example of gasoline or diesel.

As is known from the previous examples, the ignition arrangement has a precombustion chamber, with regard to the functioning of which reference is made to the introductory part of the description.

According to the disclosure, it is provided that a direct connection of the precombustion chamber to the inlet channel, to the outlet channel or both to the inlet and to the outlet channel is provided via connecting devices in order to enable a fluid, for example an air-fuel mixture or residual gases, to be respectively introduced into and discharged from the precombustion chamber. The connecting devices may be formed for example as connecting channels, or else as openings which can be connected to a connecting channel.

Via the connecting devices, it is possible to realize additional functions which can have an advantageous effect on the ignition of the air-fuel mixture or which can offer other advantages, for example with regard to the fuel consumption or the service life of the components involved.

For example, the direct connection of the precombustion chamber to the inlet and/or outlet channel can be utilized within a scavenging operating mode of the internal combustion engine in which the opening periods of the inlet and outlet valves partially overlap.

Alternatively or in addition, the direct connection of the precombustion chamber to the inlet and/or outlet channel can be utilized within a blow-through operating mode of the internal combustion engine in which a carburetor is used in combination with a turbocharger.

Alternatively or in addition, the direct connection of the precombustion chamber to the inlet and/or outlet channel can be utilized within a decompression operating mode of the internal combustion engine with which the starting behavior of the internal combustion engine can be improved.

Alternatively or in addition, the direct connection of the precombustion chamber to the inlet and/or outlet channel can be utilized within a "Millering" operating mode of the internal combustion engine by retarding of the timing of the valves.

In different embodiments, at least one of the connecting devices may be assigned a throughflow control device, for example a valve. For example, the connecting device may have a throughflow control device.

In this way, the connection between precombustion chamber and inlet and/or outlet channel can be produced or interrupted in a targeted fashion. A partial opening or closing the connection is optional.

The effective compression ratio of the internal combustion engine can be reduced by virtue of a throughflow control device which is assigned to the connecting device for the direct fluid-conducting connection between the precombustion chamber and the inlet channel being at least partially opened, such that a connection between the precombustion chamber and the inlet channel is produced, during a compression stroke of the internal combustion engine.

A further aspect of the disclosure relates to an ignition arrangement for an internal combustion engine with a precombustion chamber. The precombustion chamber has at least one first, one second, and one third group of openings for the fluid-conducting connection between the precombustion chamber and a main combustion chamber of the internal combustion engine.

For example, the openings of the first group may be configured for the discharge of residual gases from the precombustion chamber, the openings of the second group may be configured for the admission of an air-fuel mixture into the precombustion chamber, and/or the openings of the third group may be configured for the flame propagation into the main combustion chamber.

In other words, the openings of a group may in each case be optimized for a particular function, such that the disadvantages of the compromise solution described in the introduction can be avoided.

The two solutions according to the disclosure, specifically an ignition arrangement with a precombustion chamber which has connecting devices for direct fluid-conducting connection between the precombustion chamber and an inlet channel and/or an outlet channel, and an ignition arrangement with a precombustion chamber which has at least one first, one second, and one third group of openings for fluid-conducting connection between the precombustion chamber and a main combustion chamber, may also be combined with one another. In other words, the disclosure also encompasses an ignition arrangement in which the precombustion chamber has connecting devices for direct fluid-conducting connection between the precombustion chamber and an inlet channel and/or an outlet channel, and also has at least one first, one second, and one third group of openings for fluid-conducting connection between the precombustion chamber and a main combustion chamber. With such an ignition arrangement, the advantages of the ignition arrangement according to the disclosure can be realized together.

In different design variants, the openings of a group may have the same diameter. The openings of the first, second, and third groups however differ, owing to a different diameter, from the openings of the respective other groups.

It is accordingly possible for the openings of the first group to have the largest diameter, the openings of the second group to have a diameter smaller than the diameter of the openings of the first group and larger than the diameter of the openings of the third group, and for the openings of the third group to have the smallest diameter.

For example, the openings of the first group may have a diameter in the range between 3 and 4 mm, the openings of the second group may have a diameter in the range between 1.5 mm and 2.5 mm, preferably of 2 mm, and the openings of the third group may have a diameter in the range between 1 mm and 2 mm.

In further embodiments, the precombustion chamber may have a base, a combustion space roof and a lateral delimitation which connects the base to the combustion space roof. Here, the openings of the first group may be arranged in a region of the combustion space roof, the openings of the second group may be arranged in the base, and/or the openings of the third group may be arranged in the lateral delimitation.

The base may refer to the delimitation of the precombustion chamber in the direction of a piston arranged in the main combustion chamber. The combustion space roof of the precombustion chamber is situated opposite the base.

This localization of the openings is adapted to the respective function of the openings. The residual gases can thus be discharged preferably via openings in the region of the combustion space roof. The admission of the air-fuel mixture may occur preferably via openings in the base, and the flame propagation into the main combustion chamber may occur preferably via openings in the lateral delimitation.

The specific arrangement, size and function of the openings may be ascertained for a specific ignition arrangement by tests or simulations, for example CAE (computer-aided engineering) tests.

In further design variants, at least a proportion of the openings may have a throughflow control device.

The throughflow control device may for example be designed as a (shut-off) valve for opening and closing the respective opening. The drive of the throughflow control device may be realized via a cam drive, electromagnetic drive, or magnetic drive.

For example, the throughflow control devices of the openings of a group may be opened and closed simultaneously. Furthermore, the opening and closing of the openings of the various groups may occur simultaneously or in a time-offset, for example continuous, manner.

In one configuration, the throughflow control devices may be controllable in a manner dependent on an engine cycle of the internal combustion engine, on a rotational speed of the internal combustion engine and/or on an engine load of the internal combustion engine. This may permit an improved coordination of the ignition process with the engine operating state.

In different embodiments, the ignition arrangement may have a prechamber ignition plug, wherein the precombustion chamber is part of the prechamber ignition plug. Here, the precombustion chamber may project into the main combustion chamber.

Alternatively, the precombustion chamber may be part of the cylinder head. Here, the precombustion chamber may be configured so as not to project into the main combustion chamber.

A further aspect of the disclosure relates to an internal combustion engine which has a main combustion chamber which is formed by a volume enclosed by a cylinder, by a piston and by a cylinder head, an inlet channel for the admission of a fluid, for example of an air-fuel mixture, into the main combustion chamber, an outlet channel for the discharge of a fluid, for example of combustion gases, out of the main combustion chamber, and an ignition arrangement according to the description above.

FIG. 1 illustrates an internal combustion engine 2 in one example configuration. The internal combustion engine 2 has a main combustion chamber 7 which is formed by a volume enclosed by the cylinder 15, by the piston 16 and by the cylinder head 14. Fuel or an air-fuel mixture may be fed to the main combustion chamber 7 via an inlet channel 5, wherein the feed is controlled by opening and closing of the inlet valve 18. Combustion gases which are generated during the combustion process in the main combustion chamber 7 can be discharged from the main combustion chamber 7 via an outlet channel 6, which can be opened and closed via an outlet valve 19.

The internal combustion engine 2 has an ignition arrangement 1 in order to be able to ignite an air-fuel mixture present in the main combustion chamber 7 and thus effect the combustion process. The ignition arrangement 1 has a precombustion chamber 3, wherein the precombustion chamber 3 is part of the cylinder head 14 but does not project into the main combustion chamber 7. Alternatively, the precombustion chamber 3 may be part of the prechamber ignition plug 13 and project into the main combustion chamber 7 (not illustrated).

The precombustion chamber 3 is delimited in the direction of the piston 16 by a base 10. Situated opposite the base is the combustion space roof 11 of the precombustion chamber 3, which combustion space roof is connected via the lateral delimitation 12 to the base 10. The precombustion chamber 3 may for example be in the form of a circular cylindrical cavity.

In the precombustion chamber 3, an air-fuel mixture can be provided which has a different composition in relation to an air-fuel mixture in the main combustion chamber 7, such that the ignition of said air-fuel mixture is facilitated. The ignition of the air-fuel mixture in the precombustion chamber 3 is performed via the prechamber ignition plug 13.

The precombustion chamber 3 is connected via openings 9 in the base 10 of the precombustion chamber 3 to the main combustion chamber 7. For example, the cylinder head 14 and the precombustion chamber 3 may be connected to one another via a material layer which has a thickness of approximately 3 mm and into which the openings 9 are formed. Via the openings 9, an air-fuel mixture can flow into the prechamber 3, residual gases can flow out, and flames generated upon the ignition of the air-fuel mixture in the precombustion chamber 3 can propagate from the precombustion chamber 3 into the main combustion chamber 7.

Furthermore, the precombustion chamber 3 is directly connected in fluid-conducting fashion to the inlet channel 5 via a connecting device 4, for example a connecting channel, wherein the connecting device 4 is arranged at a lateral delimitation 12 of the precombustion chamber 3. Fuel or an air-fuel mixture can be fed via the connecting device 4 to the precombustion chamber 3.

Optionally, the connecting device 4 may be assigned a throughflow control device 21 such that the connecting device 4 can be opened and closed in targeted fashion. Such a throughflow control device 8 may be configured to be controllable for example in a manner dependent on an engine cycle of the internal combustion engine 2, on a rotational speed of the internal combustion engine 2 and/or on an engine load of the internal combustion engine 2. Via the connecting device 4, it is possible to realize additional functions, for example within a scavenging operating mode, a blow-through operating mode, a decompression operating mode or a "Millering" operating mode of the internal combustion engine 2. The effective compression ratio of the internal combustion engine 2 can be reduced by virtue of a throughflow control device 8 being at least partially opened during a compression stroke of the internal combustion engine 2.

FIG. 2 shows an alternative design variant of the ignition arrangement 1 of the internal combustion engine 2. In relation to the ignition arrangement 1 of FIG. 1, a second connecting device 4 is additionally provided which connects the precombustion chamber 3 and the outlet channel 6 directly to one another in fluid-conducting fashion. This second connecting device 4 may also optionally be assigned a second throughflow control device 21B, identical to a first throughflow control device 21A for a first connecting device 4. Reference is otherwise made to the statements given in relation to FIG. 1. In a further design variant which is not illustrated, only the outlet channel 6 but not the inlet channel 5 is connected directly in fluid-conducting fashion to the precombustion chamber 3 via a connecting device 4. In one example, exhaust gases from the outlet channel 6 may be routed to the precombustion chamber 3 via the further connecting device 4.

FIG. 3 shows an embodiment of the ignition arrangement 1, which may for example be part of an internal combustion engine 2 as described with regard to FIG. 1. This ignition arrangement 1 has a prechamber ignition plug 13 with a precombustion chamber 3, that is to say the precombustion chamber 3 is part of the prechamber ignition plug 13. Such a prechamber ignition plug 13, when used as part of an internal combustion engine 2, projects into the main combustion chamber 7.

The precombustion chamber 3 has multiple openings 9, which are assigned to a first group A, to a second group B and to a third group C. The openings 9 serve for fluid-conducting connection between the precombustion chamber 3 and the main combustion chamber 7. The openings 9 of a group A, B, C have the same diameter, whereas the diameters of the openings 9 differ between the three groups A, B, C.

The openings 9 of the first group A are arranged in the region of the combustion space roof 11 of the precombustion chamber 3 and may comprise a diameter of between 3 and 4 mm. They serve for the discharge of residual gases from the precombustion chamber.

The openings 9 of the second group B are arranged in the base 10 of the precombustion chamber 3 and have a diameter in the range between 1.5 mm and 2.5 mm, preferably a diameter of 2 mm. They serve for the admission of an air-fuel mixture into the precombustion chamber 3.

The openings 9 of the third group C are arranged in the lateral delimitation 12 and have a diameter in the range between 1 mm and 2 mm. They serve for the flame propagation into the main combustion chamber 7. The openings 9 of the third group C furthermore have throughflow control devices 8, which are designed as shut-off valves and which are controllable in a manner dependent on an engine cycle of the internal combustion engine, on a rotational speed of the internal combustion engine and/or on an engine load of the internal combustion engine. In one example, the throughflow control devices 8 may be identical to the first control device 21A and the second control device 21B of FIG. 2.

More specifically, the openings 9 of the first group A may be configured to receive and/or expel gases in a direction angled to a central axis 399 of the prechamber ignition plug 13. The openings 9 of the second group B may be configured to receive and/or expel gases in a direction parallel to the central axis 399. The openings 9 of the third group C may be configured to receive and/or expel gases in a direction normal to the central axis 399.

FIG. 4 depicts an engine system 100 for a vehicle. The vehicle may be an on-road vehicle having drive wheels which contact a road surface. Engine system 100 includes engine 2 which comprises a plurality of cylinders. FIG. 4 describes one such cylinder or combustion chamber in detail. The various components of engine 2 may be controlled by electronic engine controller 190.

Engine 2 includes a cylinder block 20 including at least one cylinder bore, and a cylinder head 22 including intake valves 152 and exhaust valves 154. In other examples, the cylinder head 22 may include one or more intake ports and/or exhaust ports in examples where the engine 2 is configured as a two-stroke engine. The cylinder block 20 includes cylinder walls 32 with piston 36 positioned therein and connected to crankshaft 40. Thus, when coupled together, the cylinder head 22 and cylinder block 20 may form one or more combustion chambers. As such, the combustion chamber 7 volume is adjusted based on an oscillation of the piston 36. Combustion chamber 7 may also be referred to herein as cylinder 7. The combustion chamber 7 is shown communicating with intake manifold 144 and exhaust manifold 148 via respective intake valves 152 and exhaust valves 154. Each intake and exhaust valve may be operated by an intake cam 51 and an exhaust cam 53. Alternatively, one or more of the intake and exhaust valves may be operated by an electromechanically controlled valve coil and armature assembly. The position of intake cam 51 may be determined by intake cam sensor 55. The position of exhaust cam 53 may be determined by exhaust cam sensor 57. Thus, when the valves 152 and 154 are closed, the combustion chamber 7 and cylinder bore may be fluidly sealed, such that gases may not enter or leave the combustion chamber 7.

Combustion chamber 7 may be formed by the cylinder walls 32 of cylinder block 20, piston 36, and cylinder head 22. Cylinder block 20 may include the cylinder walls 32, piston 36, crankshaft 40, etc. Cylinder head 22 may include one or more fuel injectors such as fuel injector 66, one or more intake valves 152, and one or more exhaust valves such as exhaust valves 154. The cylinder head 22 may be coupled to the cylinder block 20 via fasteners, such as bolts and/or screws. In particular, when coupled, the cylinder block 20 and cylinder head 22 may be in sealing contact with one another via a gasket, and as such the cylinder block 20 and cylinder head 22 may seal the combustion chamber 7, such that gases may only flow into and/or out of the combustion chamber 7 via intake manifold 144 when intake valves 152 are opened, and/or via exhaust manifold 148 when exhaust valves 154 are opened. In some examples, only one intake valve and one exhaust valve may be included for each combustion chamber 7. However, in other examples, more than one intake valve and/or more than one exhaust valve may be included in each combustion chamber 7 of engine 2.

In some examples, each cylinder of engine 2 may include a spark plug 13 for initiating combustion. Ignition system can provide an ignition spark to cylinder 7 via spark plug 13 in response to spark advance signal SA from controller 190, under select operating modes. However, in some embodiments, spark plug may be omitted, such as where engine 2 may initiate combustion by auto-ignition or by injection of fuel as may be the case with some diesel engines. The spark plug 13 is positioned to ignite a gas mixture within a duct 180 positioned within the combustion chamber 7 in face-sharing contact with a fire deck 184.

Fuel injector 66 may be configured to inject into the combustion chamber 7. Fuel injector 66 delivers liquid fuel in proportion to the pulse width of signal FPW from controller 12. Fuel is delivered to fuel injector 66 by a fuel system (not shown) including a fuel tank, fuel pump, and fuel rail. Fuel injector 66 is supplied operating current from driver 68 which responds to controller 190. In some examples, the engine 2 may be a gasoline engine, and the fuel tank may include gasoline, which may be injected by injector 66 into the combustion chamber 7. However, in other examples, the engine 2 may be a diesel engine, and the fuel tank may include diesel fuel, which may be injected by injector 66 into the combustion chamber. Further, in such examples where the engine 2 is configured as a diesel engine, the engine 2 may include a glow plug to initiate combustion in the combustion chamber 7.

Intake manifold 144 is shown communicating with throttle 62 which adjusts a position of throttle plate 64 to control airflow to engine cylinder 7. This may include controlling airflow of boosted air from intake boost chamber 146. In some embodiments, throttle 62 may be omitted and airflow to the engine may be controlled via a single air intake system throttle (AIS throttle) 82 coupled to air intake passage 42 and located upstream of the intake boost chamber 146. In yet further examples, AIS throttle 82 may be omitted and airflow to the engine may be controlled with the throttle 62.

In some embodiments, engine 2 is configured to provide exhaust gas recirculation, or EGR. When included, EGR may be provided as high-pressure EGR and/or low-pressure EGR. In examples where the engine 2 includes low-pressure EGR, the low-pressure EGR may be provided via EGR passage 135 and EGR valve 138 to the engine air intake system at a position downstream of air intake system (AIS) throttle 82 and upstream of compressor 162 from a location in the exhaust system downstream of turbine 164. EGR may be drawn from the exhaust system to the intake air system when there is a pressure differential to drive the flow. A pressure differential can be created by partially closing AIS throttle 82. Throttle plate 84 controls pressure at the inlet to compressor 162. The AIS may be electrically controlled and its position may be adjusted based on optional position sensor 88.

Ambient air is drawn into combustion chamber 7 via intake passage 42, which includes air filter 156. Thus, air first enters the intake passage 42 through air filter 156. Compressor 162 then draws air from air intake passage 42 to supply boost chamber 146 with compressed air via a compressor outlet tube (not shown in FIG. 4). In some examples, air intake passage 42 may include an air box (not shown) with a filter. In one example, compressor 162 may be a turbocharger, where power to the compressor 162 is drawn from the flow of exhaust gases through turbine 164. Specifically, exhaust gases may spin turbine 164 which is coupled to compressor 162 via shaft 161. A wastegate 72 allows exhaust gases to bypass turbine 164 so that boost pressure can be controlled under varying operating conditions. Wastegate 72 may be closed (or an opening of the wastegate may be decreased) in response to increased boost demand, such as during an operator pedal tip-in. By closing the wastegate, exhaust pressures upstream of the turbine can be increased, raising turbine speed and peak power output. This allows boost pressure to be raised. Additionally, the wastegate can be moved toward the closed position to maintain desired boost pressure when the compressor recirculation valve is partially open. In another example, wastegate 72 may be opened (or an opening of the wastegate may be increased) in response to decreased boost demand, such as during an operator pedal tip-out. By opening the wastegate, exhaust pressures can be reduced, reducing turbine speed and turbine power. This allows boost pressure to be lowered.

However, in alternate embodiments, the compressor 162 may be a supercharger, where power to the compressor 162 is drawn from the crankshaft 40. Thus, the compressor 162 may be coupled to the crankshaft 40 via a mechanical linkage such as a belt. As such, a portion of the rotational energy output by the crankshaft 40, may be transferred to the compressor 162 for powering the compressor 162.

Compressor recirculation valve 158 (CRV) may be provided in a compressor recirculation path 159 around compressor 162 so that air may move from the compressor outlet to the compressor inlet so as to reduce a pressure that may develop across compressor 162. A charge air cooler 157 may be positioned in boost chamber 146, downstream of compressor 162, for cooling the boosted aircharge delivered to the engine intake. However, in other examples as shown in FIG. 4, the charge air cooler 157 may be positioned downstream of the electronic throttle 62 in an intake manifold 144. In some examples, the charge air cooler 157 may be an air to air charge air cooler. However, in other examples, the charge air cooler 157 may be a liquid to air cooler.

In the depicted example, compressor recirculation path 159 is configured to recirculate cooled compressed air from upstream of charge air cooler 157 to the compressor inlet. In alternate examples, compressor recirculation path 159 may be configured to recirculate compressed air from downstream of the compressor and downstream of charge air cooler 157 to the compressor inlet. CRV 158 may be opened and closed via an electric signal from controller 190. CRV 158 may be configured as a three-state valve having a default semi-open position from which it can be moved to a fully-open position or a fully-closed position.

Universal Exhaust Gas Oxygen (UEGO) sensor 126 is shown coupled to exhaust manifold 148 upstream of emission control device 70. Alternatively, a two-state exhaust gas oxygen sensor may be substituted for UEGO sensor 126. Emission control device 70 may include multiple catalyst bricks, in one example. In another example, multiple emission control devices, each with multiple bricks, can be used. While the depicted example shows UEGO sensor 126 upstream of turbine 164, it will be appreciated that in alternate embodiments, UEGO sensor may be positioned in the exhaust manifold downstream of turbine 164 and upstream of emission control device 70. Additionally or alternatively, the emission control device 70 may comprise a diesel oxidation catalyst (DOC) and/or a diesel cold-start catalyst, a particulate filter, a three-way catalyst, a $NO_x$ trap, selective catalytic reduction device, and combinations thereof. In some examples, a sensor may be arranged upstream or downstream of the emission control device 70, wherein the sensor may be configured to diagnose a condition of the emission control device 70.

Controller 190 is shown in FIG. 4 as a microcomputer including: microprocessor unit 102, input/output ports 104, read-only memory 106, random access memory 108, keep alive memory 110, and a conventional data bus. Controller 190 is shown receiving various signals from sensors coupled to engine 2, in addition to those signals previously discussed, including: engine coolant temperature (ECT) from temperature sensor 112 coupled to cooling sleeve 114; a position sensor 134 coupled to an input device 130 for sensing input device pedal position (PP) adjusted by a vehicle operator 132; a knock sensor for determining ignition of end gases (not shown); a measurement of engine manifold pressure (MAP) from pressure sensor 121 coupled to intake manifold 144; a measurement of boost pressure from pressure sensor 122 coupled to boost chamber 146; an engine position sensor from a Hall effect sensor 118 sensing crankshaft 40 position; a measurement of air mass entering the engine from sensor 120 (e.g., a hot wire air flow meter); and a measurement of throttle position from sensor 58. Barometric pressure may also be sensed (sensor not shown) for processing by controller 190. In a preferred aspect of the present description, Hall effect sensor 118 produces a predetermined number of equally spaced pulses every revolution of the crankshaft from which engine speed (RPM) can be determined. The input device 130 may comprise an accelerator pedal and/or a brake pedal. As such, output from the position sensor 134 may be used to determine the position of the accelerator pedal and/or brake pedal of the input device 130, and therefore determine a desired engine torque. Thus, a desired engine torque as requested by the vehicle operator 132 may be estimated based on the pedal position of the input device 130.

In some examples, vehicle 105 may be a hybrid vehicle with multiple sources of torque available to one or more vehicle wheels 59. In other examples, vehicle 105 is a conventional vehicle with only an engine, or an electric vehicle with only electric machine(s). In the example shown, vehicle 105 includes engine 2 and an electric machine 52. Electric machine 52 may be a motor or a motor/generator. Crankshaft 40 of engine 2 and electric machine 52 are connected via a transmission 54 to vehicle wheels 59 when one or more clutches 56 are engaged. In the depicted example, a first clutch 56 is provided between crankshaft 40 and electric machine 52, and a second clutch 56 is provided between electric machine 52 and transmission 54. Controller 190 may send a signal to an actuator of each clutch 56 to engage or disengage the clutch, so as to connect or disconnect crankshaft 40 from electric machine 52 and the components connected thereto, and/or connect or disconnect electric machine 52 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 52 receives electrical power from a traction battery 61 to provide torque to vehicle wheels 59. Electric machine 52 may also be operated as a generator to provide electrical power to charge battery 61, for example during a braking operation.

The controller 190 receives signals from the various sensors of FIG. 4 and employs the various actuators of FIG. 4 to adjust engine operation based on the received signals and instructions stored on a memory of the controller. For example, adjusting operation of the electric machine 52 may occur based on feedback from ECT sensor 112. As will be described in greater detail below, the engine 2 and electric machine 52 may be adjusted such that their operations may be delayed based on one or more of a powertrain temperature, which may be estimated based on feedback from ECT sensor 112, and a distance between an intended destination and an electric-only operation range.

FIGS. 1-4 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

Turning to FIG. 5, it shows a method for adjusting one or more valves of a duct comprising an ignition device positioned to ignite a gas mixture arranged in the duct. Instructions for carrying out method 500 may be executed by a controller based on instructions stored on a memory of the controller and in conjunction with signals received from sensors of the engine system, such as the sensors described above with reference to FIG. 4. The controller may employ engine actuators of the engine system to adjust engine operation, according to the method described below. The method 500 may be used to adjust the first and second control devices 21A and 21B of FIG. 2 or the throughflow devices 8 of FIG. 3.

The method 500 begins at 502, which includes determining, estimating, and/or measuring current engine operating parameters. Current engine operating parameters may include but are not limited to one or more of a throttle position, manifold vacuum, engine speed, engine temperature, EGR flow rate, and air/fuel ratio.

The method 500 may proceed to 504, which includes determining if decompression is desired. In one example, decompression may be desired following an engine start, wherein the decompression may release an amount of compression from the engine during the engine start, which may allow the engine to turn over more easily.

If decompression is desired, then the method 500 may proceed to 506, which includes opening the second control device during a compression stroke. The method 500 proceeds to 508, which includes flowing combustion chamber gases from the combustion chamber, through the pre-chamber, and to the exhaust passage. As such, an in-cylinder pressure may be reduced, which may allow the engine to be turned over more easily.

Returning to 504, if decompression is not desired, then the method 500 may proceed to 510, which includes determining if adjusting the compression ratio is desired. In one example, the compression ratio may be adjusted based on an engine load. For example, if the engine load is increasing, then it may be desired to decrease the compression ratio. As another example, if the engine load is decreasing, then it may be desired to increase the compression ratio.

If the engine load is changing and a compression ratio adjustment is desired, then the method 500 may proceed to 512 to adjust a first control device closing timing. For example, if the engine load is decreasing, then the first control device closing may be retarded further into a compression stroke. Alternatively, if the engine load is increasing, then the first control device closing may be advanced closer to a beginning of the compression stroke or end of the intake stroke. The method 500 proceeds to 514 to adjust the compression ratio of the combustion chamber.

Returning to 510, if it is not desired to adjust the compression ratio, then the method 500 proceeds to 516, which includes determining if scavenging is desired. In one example, scavenging is desired following combustion where residual gases are still present in the combustion chamber. If scavenging is not desired, then the method 500 proceeds to 518, which includes maintaining current operating parameters. In one example, positions of the first control device and the second control device are not adjusted.

If scavenging is desired, then the method 500 proceeds to 520, which includes delaying a second control device closing. As such, the second control device may close during an intake stroke. The method 500 proceeds to 522, which includes replacing exhaust gases in the combustion chamber with fresh air flowing. In one example, by opening the second control device, residual exhaust gases in the combustion chamber may flow into the pre-chamber and out into the exhaust passage as intake air flows into the combustion chamber.

In this way, combustion conditions may be enhanced via the pre-chamber. The pre-chamber comprises a first passage fluidly coupling it to an inlet passage and a second passage fluidly coupling it to an exhaust passage. The technical effect of the pre-chamber is to decrease emissions while further enhancing combustion chamber conditions by controlling gas flow through the first passage and the second passage. By doing this, a compression ratio, decompression, and scavenging of the compression ratio may be adjusted by adjusting positions of valves of the first passage and the second passage.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system, comprising:
a pre-chamber comprising a first passage fluidly coupled to an inlet passage and a second passage fluidly coupled to an exhaust passage, wherein an ignition device is configured to provide a spark directly into an interior volume of the pre-chamber, wherein fuel is not injected into the pre-chamber.

2. The system of claim 1, wherein the first passage comprises a first valve and the second passage comprises a second valve.

3. The system of claim 1, wherein the pre-chamber comprises a first group of openings, a second group of openings, and a third group of openings fluidly coupling the interior volume of the pre-chamber to a combustion chamber.

4. The system of claim 3, wherein the first group of openings is sized differently than the second group of openings, and wherein the second group of openings is sized differently than the third group of openings.

5. The system of claim 3, wherein the first group of openings is larger than the second group of openings, and wherein the second group of openings is larger than the third group of openings.

6. An engine system, comprising:
a fuel injector and a spark plug, wherein the spark plug is positioned to provide a spark directly to an interior volume of a pre-chamber, wherein the pre-chamber is fluidly coupled to a combustion chamber via a plurality of openings, an intake passage via a first passage, and an exhaust passage via a second passage, and wherein a first valve is arranged in the first passage and a second valve is arranged in the second passage.

7. The engine system of claim 6, wherein the pre-chamber is arranged outside of the combustion chamber.

8. The engine system of claim 6, wherein the pre-chamber is arranged within the combustion chamber.

9. The engine system of claim 6, wherein a position of the first valve is adjusted in response to an engine load changing.

10. The engine system of claim 6, wherein a position of the second valve is adjusted in response to decompression being desired.

11. The engine system of claim 6, wherein a position of the second valve is adjusted in response to scavenging being desired.

12. The engine system of claim 6, wherein the plurality of openings comprises first openings, second openings, and third openings, wherein the first openings admit or expel gases at an angle relative to a central axis of the spark plug, wherein the second openings admit or expel gases parallel to the central axis, and wherein the third openings admit or expel gases normal to the central axis.

13. The engine system of claim 12, wherein the first openings are larger than the second openings, and wherein the second openings are larger than the third openings.

14. The engine system of claim 6, wherein the pre-chamber is symmetric.

15. A system of a spark-ignited engine, comprising:
a pre-chamber configured to at least partially house a spark plug and receive a spark therefrom, wherein the pre-chamber comprises a first passage fluidly coupled to a portion of an inlet channel upstream of an inlet valve relative to a direction of gas flow, and wherein the pre-chamber comprises a second passage fluidly coupled to a portion of an exhaust channel downstream of an exhaust valve relative to a direction of gas flow; and
a controller with computer-readable instructions stored on non-transitory memory thereof that when executed enable the controller to:
adjust an operation of a first valve in the first passage or an operation of a second valve in the second passage in response to engine conditions.

16. The system of claim 15, wherein the instructions further enable the controller to adjust a timing of the first valve in response to an engine load changing.

17. The system of claim 16, wherein the instructions further enable the controller to retard a closing of the first valve to close during a compression stroke in response to the engine load decreasing.

18. The system of claim 16, wherein the instructions further enable the controller to advance a closing of the first valve to close during an intake stroke in response to the engine load increasing.

19. The system of claim 15, wherein the instructions further enable the controller to adjust operation of the second valve in response to scavenging or decompression being desired.

* * * * *